(No Model.)

T. S. WHITMAN.
PROCESS OF CURING AND DRYING FISH.

No. 514,578. Patented Feb. 13, 1894.

WITNESSES:
Gustave Dietrich
L. M. Wachschlager.

INVENTOR:
Thomas S. Whitman,
By Briesen & Knauth
his ATTORNEYS.

THE NATIONAL LITHOGRAPHING COMPANY,
WASHINGTON, D. C.

United States Patent Office.

THOMAS SPURR WHITMAN, OF ANNAPOLIS, CANADA.

PROCESS OF CURING AND DRYING FISH.

SPECIFICATION forming part of Letters Patent No. 514,578, dated February 13, 1894.

Application filed June 1, 1892. Serial No. 435,160. (No specimens.) Patented in Newfoundland May 10, 1892.

*To all whom it may concern:*

Be it known that I, THOMAS SPURR WHITMAN, residing at Annapolis, Province of Nova Scotia, in the Dominion of Canada, have invented an Improved Process of Curing and Drying Fish and Analogous Substances, (for which I have obtained Letters Patent for fourteen years, not numbered, in Newfoundland on May 10, 1892,) of which the following is a specification, reference being had to the accompanying drawings, forming part hereof, in which—

Figure 1:
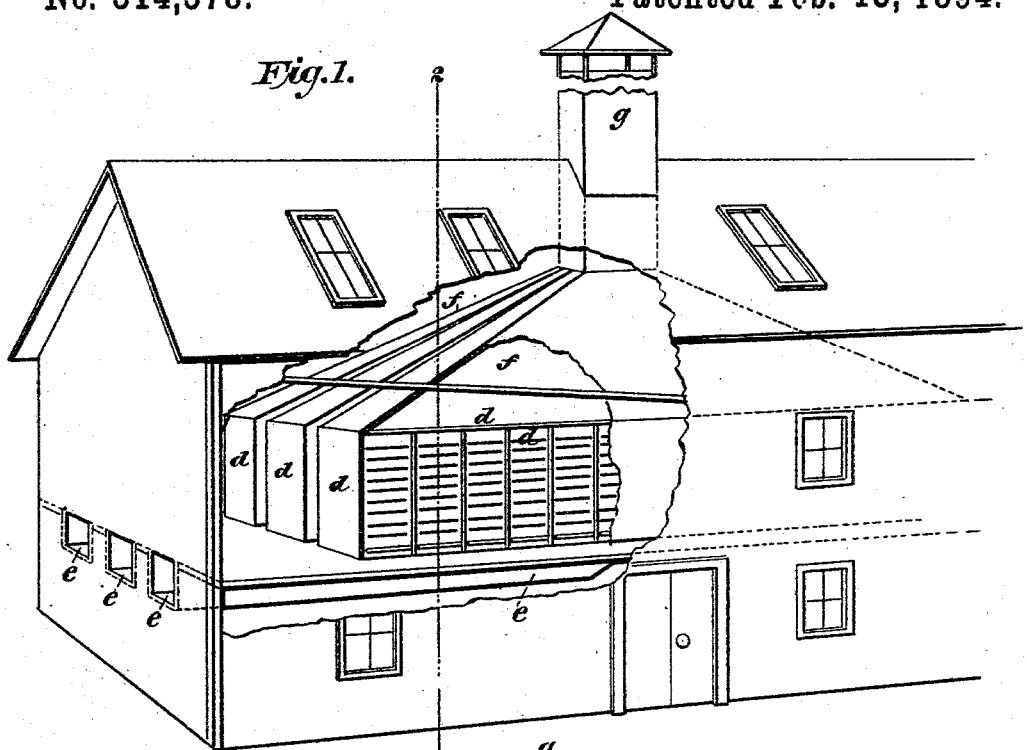
Figure 2:
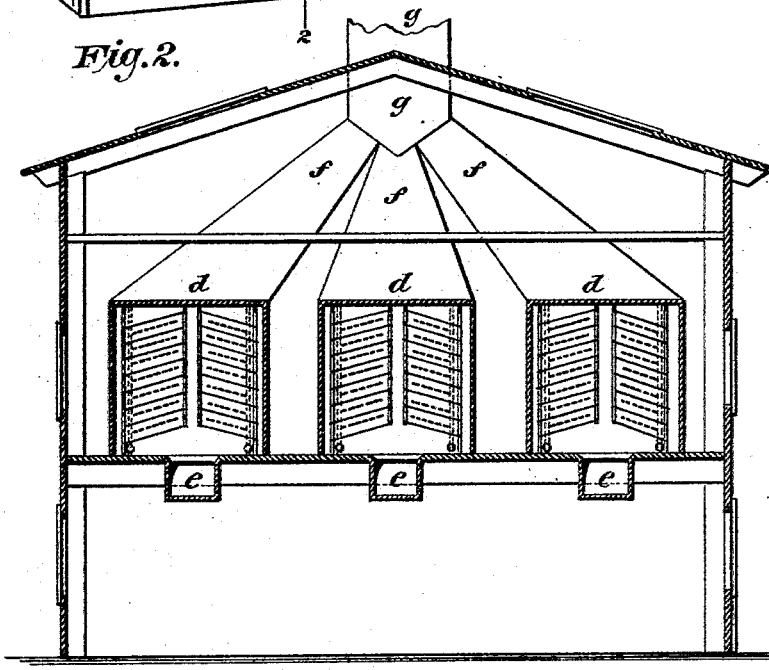
Figure 3:
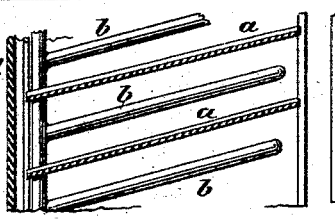

Figure 1 represents a side view, partly in section, of apparatus in which my improved process is carried on. Fig. 2 is a cross-section of said apparatus; and Fig. 3 a detail sectional elevation thereof.

This invention relates to a new manner of treating salted fish and other analogous substances so that the requisite quantity of moisture contained therein shall be rapidly eliminated and so nevertheless that the injurious effects ordinarily following from the exposure of salted fish to continuous heat are avoided. Heretofore such salted fish were most effectually dried before shipment to foreign countries by exposure to the atmospheric air, which in the climates where the process has been practiced will change rapidly from warm to cold, and in these alternating currents of warm and cold air the fish was after a great length of time finally in reasonable condition for transportation; yet there was no absolute exactness obtainable as to result, and much time was lost in following the slow methods of nature. Fish cured for transportation occupies about three weeks in curing. By my process the work can be done in about forty-eight hours. Some customers, that is to say, some countries to which such fish are exported, desire the fish to have eliminated, say, thirty per centum of moisture; others, forty per centum; others, fifty per centum. By my process the exact quantity of moisture desired can be retained in the fish so as to suit the tastes of the customers.

The following is a description of my process: The wet salted fish are taken from the kentch and washed, after which the surface water and pickle is pressed out of the fish by steam press or otherwise. After having been in press for a few hours the fish are ready to be spread on wire "flakes" or trays that are placed in rows about nine inches apart, the rows of flakes or trays being contained in compartments that are traversed by pipes in which steam or hot water is permitted to circulate.

In the drawings the letters $a$ represent the flakes.

$b$ are the circulating pipes between the flakes.

$d$ are the compartments in which the rows of flakes and systems of pipes are contained. The temperature which the steam or hot water in the pipes $b$ should impart to the compartments is about 95° Fahrenheit. The fish having been spread upon the trays or flakes in the compartments is allowed to remain in a temperature of 90° to 95° for a few hours or until they are thoroughly warmed, whereupon currents of cool dry air are forced over and under the fish as they are spread on these flakes or trays. These currents of cool dry air in the mechanism shown in the drawings come from channels or flues $e$ that open into the compartments $d$. By opening and closing these air-flues at proper intervals of say two or three hours, thus first submitting the fish to a bath of heated air and then admitting cold air, then again submitting them to a bath of heated air, then again admitting a current of cold air, &c., from one to two per centum of moisture per hour is taken from the fish. The products of evaporation are carried off from the compartments $d$ by flues $f$ running to a chimney $g$, or suitable ventilators may be placed in the tops of the compartments for carrying off the moisture to the roof of the building, or otherwise. It will be perceived that if the heating process were carried on by itself continuously instead of interruptedly, as above described, the atmosphere surrounding the fish would soon be charged with moisture from the fish to such an extent as to prevent any further evaporation, and the fish, too, would be injured by being warmed for too long a time or too thoroughly. The currents of fresh air which I alternate with the heating process described, serve to bring down the temperature of the fish and also to carry off the moisture-laden atmosphere which surrounds the fish, bringing into action fresh air which is ready to be charged with new moisture carried away from the fish by the next heating process.

Having described my invention, what I claim is—

The process of curing and drying fish and the like, which consists in supporting the fish within a body of air confined at its sides and bottom, heating said body of air while it surrounds the fish and venting it freely at its upper portion, whereby a slow movement of said heated air may take place in over and about the fish; interrupting said heating treatment and cooling the fish and driving off the mositure laden heated air by the admission of a current of cool air; resuming the interrupted heating treatment; again interrupting it in like manner; and so on, alternately, until the fish is cured and dried, substantially as described.

THOMAS SPURR WHITMAN.

Witnesses:
SIMEON D. TOBIAS,
JOHN F. WHITMAN.